Aug. 4, 1964         G. G. MATHEUS         3,143,197
                    OPERATOR FOR JALOUSIES
Filed Oct. 23, 1962                      2 Sheets-Sheet 2
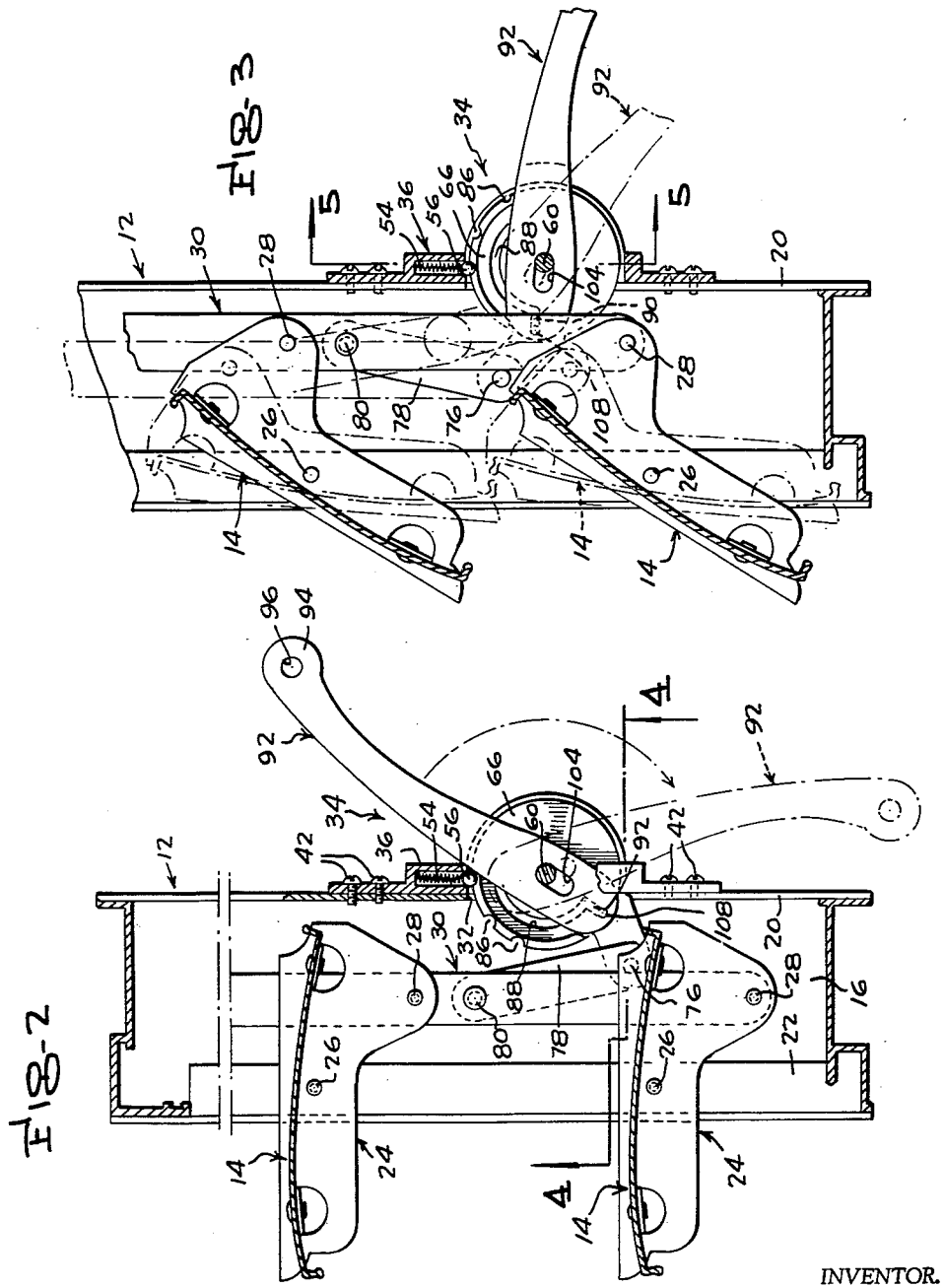
INVENTOR.
GONZALO GARCIA MATHEUS
BY
ATTORNEYS United States Patent Office 3,143,197
Patented Aug. 4, 1964

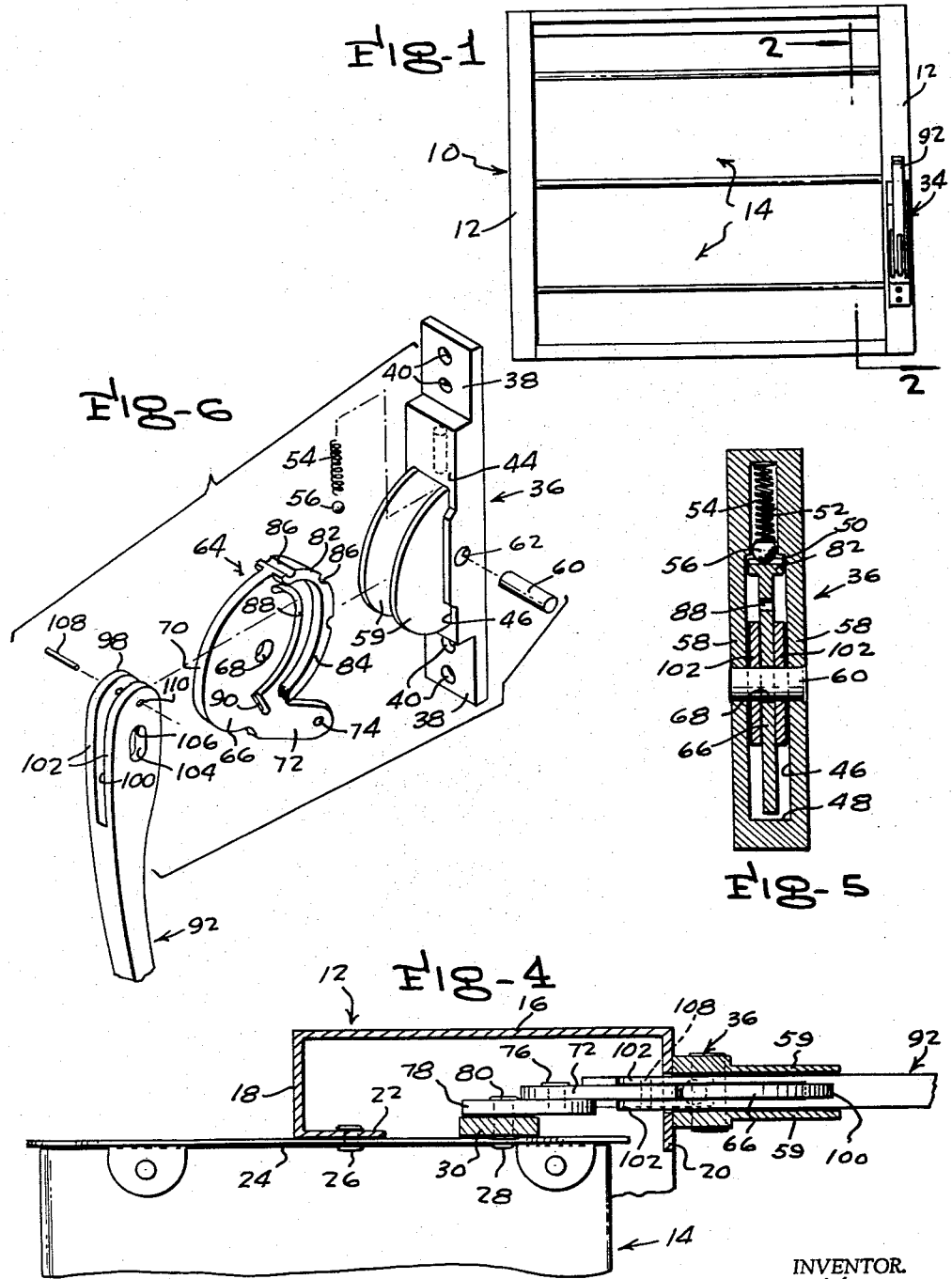

3,143,197
OPERATOR FOR JALOUSIES
Gonzalo Garcia Matheus, Calle 64, 4–134 Bella-Vista,
Maracaibo, Venezuela
Filed Oct. 23, 1962, Ser. No. 232,427
7 Claims. (Cl. 189—62)

This invention relates to a novel operator for the louvers of jalousies.

The primary object of the invention is the provision of a more efficient, more easily and quickly actuated, more durable, and less costly device of the kind indicated, which can be readily installed on the frames of jalousies and connected to their operating bars, and which has novel and improved means for locking the louvers of the jalousies in open, closed, and intermediate positions.

Another object of the invention is the provision of a mechanically and structurally superior, simpler, more easily manufactured, and more rugged device of the character indicated above, which is composed of a small number of uncomplex and easily assembled parts, and wherein the operating handle hangs close to the jalousie frame, in an out-of-the-way position, when not in use.

Other important objects and advantageous features of the invention will be apparent from the following description and the accompanying drawings, wherein, for purposes of illustration only, a specific form of the invention is set forth in detail.

In the drawings:

FIGURE 1 is an inside elevation of a jalousie window, equipped with a device of the present invention, the louvers of the window being closed;

FIGURE 2 is an enlarged fragmentary vertical transverse section taken on the line 2—2 of FIGURE 1, showing the louvers in open position and the handle of the device in elevated position in full lines, and in depressed free-hanging position, in phantom lines;

FIGURE 3 is a view like FIGURE 2, showing the louvers in partially closed position;

FIGURE 4 is an enlarged fragmentary horizontal section taken on the line 4—4 of FIGURE 2;

FIGURE 5 is a fragmentary vertical longitudinal section, taken on the line 5—5, of FIGURE 3 and on the scale of FIGURE 4; and, FIGURE 6 is an exploded perspective view showing the components of the device.

Referring in detail to the drawings, a jalousie 10 is shown, in the form of a window, whose frame has vertical side members 12, of laterally inwardly opening channel form, between which louvers 14 extend. As shown in FIGURE 4, the side members 12 have transverse vertical webs 16, outer laterally inwardly extending lateral flanges 18, and inner laterally inwardly extending flanges 20. The outer flanges 18 have lateral portions 22, extending toward the inner flanges 20, on which the louvers are pivoted, at outwardly spaced locations. The louvers 14 have vertical, transversely elongated brackets 24, on their ends, which are centrally traversed by riveted pivot pins 26, which extend through the side member flange portions 22. At points spaced inwardly from the pivot pins 26, and therebelow, the brackets 24 have rivetted pivot pins 28 extending therethrough which operatively connect the brackets to a vertically elongated operating bar 30, which is disposed within and is substantially spaced from the flanges 18 and 20 of a side member 12, as shown in FIGURE 4, and which, when moved upwardly and downwardly, open and close the louvers, respectively. The foregoing jalousie structure is detailed, only in the interest of exemplification and clarity, and does not limit applicability of the invention to jalousies of differing construction.

In accordance with the present invention, the inner flange 20 of a side member 12, is provided with a vertically elongated slot 32, with relation to which a device of the present invention, generally designated 34, is mounted to the flange 20. The device 34 comprises a vertically elongated housing 36, in the form of a flat bar of substantial thickness, having, on its ends, reduced thickness mounting ears 38, provided with bolt or screw holes 40, which receive screws 42, which, as shown in FIGURES 2 and 3, are threaded through the flange 20, at locations spaced above and below the slot 32, so as to mount the housing 36 to the inner surface of the flange 20. The main portion 44 of the housing 36, extending between the ears 38, is formed therethrough with a closed vertical slot 46, of substantially the same length and width as, and registered with, the slot 32, the slot 46 being downwardly offset toward the lower end of the main portion 44. The lower end 48 of the slot 46, is closed, while its upper end 50 has opening thereto the lower end of a vertical counterbore 52, formed in the upper part of the main portion 44, in which is disposed a vertical coil spring 54, which is compressed between the upper end of the counterbore and a detent ball 56, whose function is hereinafter described.

The housing slot 46 defines side walls 58 which includes semi-circular bearing plates 59 which project inwardly beyond the side walls 58, as shown in FIGURE 6. A relatively large diameter riveted pivot pin 60 extends between the side walls 58 and the bearing plates and has its ends securably engaged in openings 62, provided in the side walls, at the centers of curvature of the bearing plates.

A rotor 64 is rotatably engaged in the housing slot 46, between the bearing plates 59, and comprises a flat disc 66 having an axial opening 68 receiving the pivot pin 60, the disc 66 having substantially the same diameter as the bearing plates 59, and being thinner than the space between the bearing plates. The disc 66 is formed, on the lower part of the peripheral edge 70, with a downwardly and outwardly angled chordal lever arm 72, which is provided, at its outer end, with a hole 74 which receives a riveted pivot pin 76, which pivots the arm 72 to the lower end of an upstanding link 78, which is pivoted, at its upper end, as indicated at 80, to the louver operating bar 30, as shown in FIGURES 2 and 3.

The outer part of the peripheral edge of the rotor disc 66 extending upwardly from the lever arm 72, is provided with a semi-circular rim 82, which is of uniform width and extends from opposite sides of the disc. The rim 82 has outer edges 84 which bear slidably against the inner surfaces of the bearing plates 59. The outer surface of the rim 82 is formed, at spaced intervals, with detent grooves 86, which extend thereacross, and are adapted to selectively receive the detent ball 56, for holding the rotor 64, and hence the louvers 14, in selected open and closed positions.

The rotor disc 66 is formed with an arcuate closed slot 88 which is spaced inwardly from and extends concentrically along the length of rim 82. At its lower end, the slot 88 is provided with a radial extension 90 which extends outwardly from the slot 88 into the lever arm 72.

A handle 92, for rotating the rotor 64 and positioning the jalousie louvers 14, comprises an elongated, upwardly bowed, preferably rectangular cross section bar, of a thickness, at its outer end, to work between and bear against the inner surfaces of the bearing plates 59. The outer end of the handle 92 is provided with a circular enlargement 94, formed with a hole 96, through which an operating cord or rod (not shown) can be secured.

The inner end of the handle 92 is rounded, as indicated at 98, and has opening thereto, a vertical longitudinal slot 100, of a width to closely receive the rotor disc 66, and of a length to then extend outwardly beyond the center of the disc and work endwise relative to the pivot pin 60. The slot 100 defines a pair of spaced arms 102 which are centrally formed with registered, longitudinally elongated closed slots 104, which have rounded ends 106. The slots 104 receive the pivot pin 60 and since their lengths are greater than the diameter of the pivot pin 60, the handle 92 can move lengthwise relative to the pivot pin 60.

A riveted combined guide and locking pin 108 extends through holes 110, provided in the handle arms 102, at locations spaced outwardly from the elongated slots 104, and in line therewith, and extends between the arms 102 and through the arcuate slot 88 of the rotor disc 66, whereby upward and downward surveying of the handle 92, relative to the rotor 64 is limited, and whereby, when the handle is in opened position, such as the full line elevated position, as shown in FIGURE 2, the handle can be moved downwardly and forwardly, relative to the rotor 64, for placing the stop pin 108 in the extension 90 of the arcuate slot 88, and thereby locking the handle against rotation, relative to the rotor 64, until its handle be moved upwardly and inwardly, relative to the rotor, far enough to move the pin 108 out of the extension 90 and into the main part of the arcuate slot 88. The same endwise movements of the handle are employed in pendant portions of the handle, relative to the rotor 64, for locking the handle against rotation. These lockings of the handle 92 are performed as the detent ball 56 drops into a selected detent groove 86 of the rotor 64, as the handle is rotated in either direction, which corresponds with the desired position of the louvers 14, and serve to lock the louvers therein.

In operation, the louvers 14 being in any position, between open and closed, and it being desired to move them to and lock them in another position, the handle 92, being in depressed fall-hanging position, is moved upwardly and then endwise in a direction to engage the pin 108 in the arcuate groove extension 90 of the rotor 64, and then rotated or swung, relative to the rotor 64, so that the rotor 64 is thereby reached around the pivot pin 60, against the resistance of the spring 54 and the detent ball 56, engaging with the surface of the rim 82 and the detent grooves 86, until the desired new position of the louvers has been reached, and the detent ball 56 drops into the detent groove 86 corresponding to that portion. The handle 92 is then moved endwise so as to put the locking pin 108 in its arcuate groove extension 90.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a jalousie frame having vertical side members, louvers extending between and pivoted on the side members, an operating bar pivoted to the louvers at a point eccentric relative to the pivotal axes of the louvers, a housing fixed to one of the side frame members, a rotor axially journaled on the housing, a lever arm on said rotor, a link pivotally connected at one end to said lever arm and at the other end to said operating bar, a handle pivotally and slidably mounted on the housing, a guide and locking pin on said handle and engageable with said rotor to rotate the latter and shift the louvers between open and closed positions or partially open positions, and a spring-biased detent on said housing and selectively seatable in detent grooves formed in said rotor for holding the louvers in open and closed positions or in partially open positions.

2. In combination, a jalousie frame having vertical side members, louvers extending between and pivoted on the side members, an operating bar pivoted to the louvers at points eccentric relative to the pivotal axes of the louvers, a housing fixed to one of the frame side members, a handle pivotally and slidably mounted on the housing, and means mounted on the housing and operatively connecting the handle to the operating bar, said connecting means comprising a link pivotally connected at one end to said operating bar, a rotor axially journalled on the housing and having a lever arm pivoted to the other end of said link, and lost-motion means for connecting the handle and the rotor to rotate together in one direction, said lost-motion means comprising an arcuate concentric closed slot formed in the rotor, a guide and locking pin on the handle engaged in the arcuate slot, said arcuate slot terminating at one end in a radial extension into which said locking pin is adapted to be moved by endwise movement of the handle relative to the rotor for locking the handle against rotation relative to the rotor, the other end of the arcuate slot being adapted to be engaged by the locking pin for rotating the rotor by means of the handle for pivoting the louvers relative to the jalousie frame.

3. In combination, a jalousie frame having vertical side members, louvers extending between and pivoted on the side members, a vertical operating bar pivoted to the louvers at points eccentric relative to the pivotal axes of the louvers, a housing fixed to one of the frame side members, a handle pivotally and slidably mounted on the housing, and means mounted on the housing and operatively connecting the handle to the operating bar, said connecting means comprising a link pivotally connected at one end to said operating bar, a rotor axially journalled on the housing and having a lever arm pivoted to the other end of said link, and lost-motion means for connecting the handle and the rotor to rotate together in one direction, said lost-motion means comprising an arcuate concentric closed slot formed in the rotor, a guide and locking pin on the handle engaged in the arcuate slot, said arcuate slot terminating at one end in a radial extension into which said locking pin is adapted to be moved by endwise movement of the handle relative to the rotor for locking the handle against rotation relative to the rotor, the other end of the arcuate slot being adapted to be engaged by the locking pin for rotating the rotor by means of the handle for pivoting the louvers relative to the jalousie frame, said rotor having a concentric arcuate rim thereon formed with circumferentially spaced detent depressions, said housing having a spring-pressed detent ball engaged with the surface of the rim and engageable in a selected one of the detent depressions in different pivoted positions of the louvers.

4. In combination, a jalousie frame having vertical side members, louvers extending between and pivoted on the side members, a vertical operating bar adjacent to one of said side members and pivoted to the louvers at points eccentric relative to their pivotal axes, said one side member having a vertical slot at one side of the operating bar, a housing fixed to said one side member and having a vertically elongated slot registered with the side member slot, the slot of the housing defining vertical side walls, a rotor axially positioned within the housing slot, a pivot pin fixed to and extending between the side walls on which the rotor is axially journalled, said rotor comprising a circular disc having a peripheral edge, a chordal lever arm on said peripheral edge, a link pivoted at one end to said lever arm and at its other end to the operating bar, a handle rotatably and slidably journalled at one end on said pivot pin and movable endwise relative to the pivot pin, said handle having a transverse locking pin eccentric relative to the pivot pin, said disc having a concentric arcuate slot in which the locking pin is engaged, said arcuate slot having a closed end against which the locking pin is adapted to be engaged for rotating the rotor in one direction by means of the handle, a lateral extension on the other end of the arcuate slot into which the locking pin is adapted to be moved by endwise movement of the handle for locking the handle against rotation relative to the rotor.

5. In combination, a jalousie frame having vertical side members, louvers extending between and pivoted on the side members, a vertical operating bar adjacent to one of said side members and pivoted to the louvers at points eccentric relative to their pivotal axes, said one side member having a vertical slot at one side of the operating bar, a housing fixed to said one side member and having a vertically elongated slot registered with the side member slot, the slot of the housing defining vertical side walls, a rotor axially positioned within the housing slot, a pivot pin fixed to and extending between the side walls on which the rotor is axially journalled, said rotor comprising a circular disc having a peripheral edge, a chordal lever arm on said peripheral edge, a link pivoted at one end to said lever arm and at its other end to the operating bar, a handle rotatably and slidably journaled at one end on said pivot pin and movable endwise relative to the pivot pin, said handle having a transverse locking pin eccentric relative to the pivot pin, said disc having a concentric arcuate slot in which the locking pin is engaged, said arcuate slot having a closed end against which the locking pin is adapted to be engaged for rotating the rotor in one direction by means of the handle, a lateral extension on the other end of the arcuate slot into which the locking pin is adapted to be moved by endwise movement of the handle for locking the handle against rotation relative to the rotor, an arcuate concentric rim on the peripheral edge of the disc having side edges bearing against the inner surfaces of the housing side walls, said rim having an outer surface formed with circumferentially spaced detent depressions, said housing having a counterbore opening to one end of the housing slot, and a spring-pressed detent ball positioned in the counterbore and engaged with the outer surface of the rim and adapted to drop onto related ones of the detent depressions.

6. In combination, a jalousie frame having vertical side members, louvers extending between and pivoted on the side members, a vertical operating bar adjacent to one of said side members and pivoted to the louvers at points eccentric relative to their pivotal axes, said one side member having a vertical slot at one side of the operating bar, a housing fixed to said one side member and having a vertically elongated slot registered with the side member slot, the slot of the housing defining vertical side walls, a rotor axially positioned within the housing slot, a pivot pin fixed to and extending between the side walls on which the rotor is axially journalled, said rotor comprising a circular disc having a peripheral edge, a chordal lever arm on said peripheral edge, a link pivoted at one end to said lever arm and at its other end to the operating bar, a handle rotatably and slidably journaled at one end on said pivot pin and movable endwise relative to the pivot pin, said handle having a transverse locking pin eccentric relative to the pivot pin, said disc having a concentric arcuate slot in which the locking pin is engaged, said arcuate slot having a closed end against which the locking pin is adapted to be engaged for rotating the rotor in one direction by means of the handle, a lateral extension on the other end of the arcuate slot into which the locking pin is adapted to be moved by endwise movement of the handle for locking the handle against rotation relative to the rotor, said handle having a rounded end, a longitudinal slot in the handle opening to said rounded end and defining spaced handle arms, said longitudinal slot receiving the rotor disc with said handle arms at opposite sides of the disc, said arms having longitudinally elongated closed slots formed therein and receiving said pivot pin, the closed slots being larger than the diameter of the pivot pin.

7. In combination, a jalousie frame having vertical side members, louvers extending between and pivoted on the side members, a vertical operating bar adjacent to one of said side members and pivoted to the louvers at points eccentric relative to their pivotal axes, said one side member having a vertical slot at one side of the operating bar, a housing fixed to said one side member and having a vertically elongated slot registered with the side member slot, the slot of the housing defining vertical side walls, a rotor axially positioned within the housing slot, a pivot pin fixed to and extending between the side walls on which the rotor is axially journaled, said rotor comprising a circular disc having a peripheral edge, a chordal lever arm on said peripheral edge, a link pivoted at one end to said lever arm and at its other end to the operating bar, a handle rotatably and slidably journaled at one end on said pivot pin and movable endwise relative to the pivot pin, said handle having a transverse locking pin eccentric relative to the pivot pin, said disc having a concentric arcuate slot in which the locking pin is engaged, said arcuate slot having a closed end against which the locking pin is adapted to be engaged for rotating the rotor in one direction by means of the handle, a lateral extension on the other end of the arcuate slot into which the locking pin is adapted to be moved by endwise movement of the handle for locking the handle against rotation relative to the rotor, said handle having a rounded end, a longitudinal slot in the handle opening to said rounded end and defining spaced handle arms, said longitudinal slot receiving the rotor disc with said handle arms at opposite sides of the disc, said arms having longitudinally elongated closed slots formed therein and receiving said pivot pin, the closed slots being larger than the diameter of the pivot pin, an arcuate rim on the peripheral edge of the disc and having side edges, said housing side walls having semi-circular bearing plates extending therefrom with which the side edges of the rim and the outer sides of the handle arms are engaged.

References Cited in the file of this patent
UNITED STATES PATENTS

| | | |
|---|---|---|
| 2,910,743 | Muhn | Nov. 3, 1959 |
| 2,954,590 | Dynner | Oct. 4, 1960 |